(12) United States Patent
Pratchler

(10) Patent No.: US 7,571,922 B2
(45) Date of Patent: Aug. 11, 2009

(54) TRAILER HITCH COUPLING AND ANTI-THEFT DEVICE THEREFORE

(76) Inventor: Jerome B. Pratchler, Box 280, Muenster, Saskatchewan (CA) S0K 2V0

( * ) Notice: Subject to any disclaimer, the term of this patent is extended or adjusted under 35 U.S.C. 154(b) by 0 days.

(21) Appl. No.: 11/923,049

(22) Filed: Oct. 24, 2007

(65) Prior Publication Data

US 2008/0093823 A1    Apr. 24, 2008

Related U.S. Application Data

(60) Provisional application No. 60/862,695, filed on Oct. 24, 2006.

(30) Foreign Application Priority Data

Oct. 24, 2006    (CA) .................................. 2567105

(51) Int. Cl.
*B60D 1/36* (2006.01)
(52) U.S. Cl. .................................................. 280/477
(58) Field of Classification Search ............... 280/477, 280/512
See application file for complete search history.

(56) References Cited

U.S. PATENT DOCUMENTS

| | | | | |
|---|---|---|---|---|
| 2,647,761 A | * | 8/1953 | Kentz | 280/446.1 |
| 3,383,119 A | * | 5/1968 | Carroll | 280/426 |
| 3,588,145 A | * | 6/1971 | Thompson | 280/156 |
| 4,417,748 A | | 11/1983 | Dortch | |
| 4,802,686 A | * | 2/1989 | Isreal | 280/477 |
| 5,114,170 A | | 5/1992 | Lanni et al. | |
| 5,161,815 A | * | 11/1992 | Penor, Jr. | 280/477 |
| 5,769,443 A | * | 6/1998 | Muzny | 280/477 |
| 5,779,256 A | | 7/1998 | Vass | |
| 5,887,885 A | * | 3/1999 | Byers et al. | 280/512 |
| 6,796,573 B2 | | 9/2004 | Beaudoin | |
| 6,976,694 B1 | | 12/2005 | Rayl et al. | |

* cited by examiner

*Primary Examiner*—Lesley D. Morris
*Assistant Examiner*—Daniel Yeagley
(74) *Attorney, Agent, or Firm*—Ade & Company Inc.; Ryan W. Dupuis; Kyle R. Satterthwaite

(57) ABSTRACT

A hitch coupling features a hitch ball receiving socket, a guide body connected thereto and a mounting body extending from the guide body at an end opposite the socket. The guide body features two generally vertical side walls horizontally spaced apart adjacent the socket and diverging horizontally away therefrom and a ramping surface defined between the two generally vertical side walls extending upward away from the mounting body toward the socket. The sloped ramping surface encourages mating of the hitch and socket under the weight of a trailer. A rear wall of the socket extends downward toward the ramping surface to block inadvertent withdrawal of a hitch ball. When the coupling is not in use, access to the socket can be blocked by a unique anti-theft device that is removable to avoid interference with subsequent use of the sloped ramping surface.

14 Claims, 6 Drawing Sheets

TRAILER HITCH COUPLING AND ANTI-THEFT DEVICE THEREFORE

This application claims benefit under 35 U.S.C. 119 of U.S. Provisional Patent Application Ser. No. 60/862,695 and Canadian Patent Application Serial No. 2,567,105, each filed Oct. 24, 2006.

FIELD OF THE INVENTION

The present invention relates generally to a hitch coupling for mounting on a trailer to engage with a hitch ball mounted on a towing vehicle and an anti-theft device for such a coupling, and more particularly to hitch couplings having surfaces arranged to encourage and retain mating between a receiving socket of the coupling and the hitch ball.

BACKGROUND OF THE INVENTION

With a conventional hitch coupling, it is often necessary to back up the towing vehicle directly into alignment with the trailer so that the receiving socket of the hitch coupling on the trailer directly overlies the connecting ball of the hitch of the towing vehicle. This need arises especially when connecting a heavy trailer, as a relatively light trailer can likely be shifted manually to the required aligned position but it may not be possible to manually maneuver a heavy trailer. Misalignment requires that the towing vehicle be withdrawn and backed up again until the alignment is correct. This may require that a driver exit the vehicle a number of times to check alignment and to move forwards and backwards a number of times to complete the alignment.

To improve the ease of connecting a trailer and towing vehicle, devices have been developed to aid in achieving proper alignment between the hitch ball of the vehicle and the ball receiving socket of the trailer's hitch coupling.

U.S. Pat. No. 5,114,170 of Lannie et al. and U.S. Pat. No. 6,796,573 of Beaudoin each teach a device for connection to a trailer mounted hitch coupling to guide a vehicle carried hitch ball towards the receiving socket of the coupling. Each device features to members that horizontally converge toward the receiving socket so that the vehicle need be backed up only with enough precision to dispose the ball hitch between the members at widely spaced ends thereof. Upon further reversing, the converging members constrain the hitch ball to enter the socket situated at a narrower position along the device.

U.S. Pat. No. 4,417,748 of Dortch, U.S. Pat. No. 5,779,256 of Vass and U.S. Pat. No. 6,976,694 of Rayl et al. each teach an alignment device that similarly features horizontally converging side walls, but mounts on the towing vehicle rather than on the trailer. The side walls begin are connected forward of the hitch ball and diverge extending rearwardly therefrom so as to guide the hitch coupler on the trailer toward the hitch ball as the towing vehicle is reversed toward the trailer.

U.S. Pat. No. 4,802,686 of Isreal teaches a hitch coupling for mounting on a trailer which includes a hitch ball receiving compartment having two vertical side walls horizontally diverging away from a common end of the compartment. A generally horizontal top panel covers the ball receiving compartment and extends rearward therefrom to cover space between the side walls. The device is connected to a trailer at the wider end of the walls to support the receiving compartment and covered space between the walls forward of the trailer. In use, the towing vehicle is backed up to position the hitch ball past the receiving compartment between the side walls. The trailer is then lowered to rest the top panel on the hitch ball, the towing vehicle is driven forward and the side walls guide the moving hitch ball toward the receiving compartment. With the hitch ball received in the compartment, a pin with a lock lever is used to secure the connection by blocking withdrawal of the ball hitch.

SUMMARY OF THE INVENTION

According to one aspect of the invention there is provided a hitch coupling for mounting on a trailer for engagement with a hitch ball mounted on a towing vehicle, the hitch coupling comprising:

a hitch ball receiving socket;

a guide body connected to the hitch ball receiving socket and extending to one side thereof; and a mounting body extending from the guide body at an end thereof opposite the hitch ball receiving socket;

the guide body comprising:

two generally vertical side walls being horizontally spaced apart adjacent the one side of the hitch ball receiving socket and diverging horizontally away therefrom; and a sliding surface defined between the two generally vertical side walls extending upward away from the mounting body toward the hitch ball receiving socket.

The hitch coupling is mountable on a trailer for use in a manner similar to that of Isreal and offers similar benefits over conventional hitch couplings. Unlike conventional couplings, the towing vehicle only needs to be backed up with enough precision to position the ball hitch somewhere between the spaced apart side walls rearward of the receiving socket. The diverging walls provide a target area of greater length and width than the receiving socket itself. The trailer is lowered to rest the coupling atop the hitch ball and the towing vehicle is then driven forward with the side walls guiding the hitch ball toward the receiving socket due to their convergence theretoward. The hitch coupling is improved by the sloped sliding surface which acts as a ramp to further encourage receipt of the hitch ball into the receiving socket. When the sliding surface is lowered onto the hitch ball, weight of the trailer exerted on the hitch ball at the coupling encourages relative sliding between the sloped surface and hitch ball toward receipt of the hitch ball into the receiving socket due to the slope of the sliding surface. Using the trailer's weight toward mating of the hitch ball and receiving socket reduces the amount of external force, for example the force provided by forward driving of the towing vehicle or by manual movement of the trailer, needed to achieve coupling.

According to another aspect of the invention there is provided a hitch coupling for mounting on a trailer for engagement with a hitch ball mounted on a towing vehicle, the hitch coupling comprising:

a hitch ball receiving socket;

a guide body connected to the hitch ball receiving socket and extending to one side thereof; and a mounting body extending from the guide body at an end thereof opposite the hitch ball receiving socket;

the guide body comprising:

two generally vertical side walls being horizontally spaced apart adjacent the one side of the hitch ball receiving socket and diverging horizontally away therefrom; and a sliding surface extending between the two generally vertical side walls for sliding contact of the hitch ball therewith toward the hitch ball receiving socket;

and the hitch ball receiving socket comprising a wall extending downward at an end thereof proximate the guide body toward the sliding surface.

Once the socket has received the hitch ball, its rear wall blocks relative movement of the hitch ball out of the receiving socket and back along the sliding surface Inadvertent withdrawal of the hitch ball from the socket due relative motion of the towing vehicle and trailer toward one another is prevented. For example, with the ball and socket mated and the towing vehicle parked in a fixed position, forward rolling of the trailer toward the vehicle, for example due to a sloped surface on which the wheels of the trailer are disposed, is blocked by contact between the hitch ball and the rear wall of the socket.

Preferably the sliding surface is defined by a plate supported between the two generally vertical side walls.

Preferably the sliding surface extends to the end of the guide body oppose the hitch ball receiving socket.

Preferably the sliding surface extends to the hitch ball receiving socket.

Preferably each generally vertical side wall extends below the sliding surface.

Preferably each generally vertical side wall extends below the sliding surface at every point therealong.

Preferably each generally vertical side wall, at every point therealong, extends below the sliding surface.

Preferably the guide body further comprises a top plate spanning between the two generally vertical side walls at top edges thereof.

Preferably the hitch ball receiving socket comprises an inner surface comprising a dome-like contour.

Preferably the hitch ball receiving socket comprises an inner surface being curved along a top portion thereof. The hitch ball receiving socket may comprise an inner surface comprising a dome-like contour or a substantially hemispherical portion. The curved inner surface better conforms to the shape of a conventional hitch ball which is substantially spherical.

Preferably the hitch ball receiving socket is formed by casting.

Preferably the two generally vertical side walls are formed by casting.

The sliding surface may be defined by a metal plate secured between the two generally vertical side walls by welding.

Preferably the mounting body comprises two generally vertical side plates and a generally horizontal top plate extending therebetween to form a rectangular channel extending from the guide body in a direction opposite the hitch ball receiving socket.

Preferably at least one passage is defined extending through the two generally vertical side plates of the mounting body across the rectangular channel for receiving at least one fastener.

Preferably at least one passage is defined extending through the top plate of the mounting body for receiving at least one fastener.

Preferably the at least one passage comprises two passages.

Preferably there is provided fasteners for securing the mounting body to the trailer.

Preferably the fasteners comprise bolts.

Preferably there is provided a locking mechanism operable to at least partially obstruct an opening to the hitch ball receiving socket.

Preferably there is provided a pin being selectively positionable to extend across an opening to the hitch ball receiving socket and being lockable when so positioned.

Preferably the guide body has a passageway extending transversely therethrough at the opening to the hitch ball receiving socket through which the pin is passable. With the downward extending rear wall of the socket restricting forward movement of the trailer once the coupler socket has been placed over the hitch ball, easy locking of coupler (insertion of locking pin) is ensured by preventing movement of the trailer forward subsequent to engagement of the hitch ball and socket, which otherwise may act to block the pin-receiving holes or passageway and prevent insertion of locking pin into the coupler to complete hook-up of the trailer.

Preferably there is provided a closing device lockable at an opening to the hitch ball receiving socket to obstruct access to the hitch ball receiving socket from below. The closing device can thus be installed on the coupling when not mating with a hitch ball so as to prevent theft of the trailer by blocking access to the receiving socket by the hitch ball on the vehicle of a would-be thief.

Preferably the closing device is supportable at the opening to extend toward an end of the hitch ball receiving socket opposite the guide body and upward within the hitch ball receiving socket.

Preferably the closing device is pivotally mountable at the opening and dimensioned to limit pivoting about the pin by contact with an interior surface of the hitch ball receiving socket.

Preferably the closing device comprises a tubular body, through which a shaft of the pin is passable along the passageway extending transversely through the guide body at the opening to the hitch ball receiving socket, and a protrusion extending from the tubular body to obstruct access to the hitch ball receiving socket from below, with the pin being lockable in position extending transversely across the opening to the hitch ball receiving socket.

Preferably the closing device comprises a right-angle portion positionable to extend away from the guide body and upward within the hitch ball receiving socket.

Preferably the pin comprises a stop proximate one end thereof to prevent passage of the pin in entirety from one side of the coupling an opposite side and a hole proximate an end opposite the stop to receive a lock for cooperating with the stop to prevent withdrawal of the pin.

According to a further aspect of the invention there is provided an anti-theft device for a trailer hitch coupling having openings in opposite sides thereof to define a passageway extending transversely through the trailer hitch coupling at an opening to a hitch ball receiving socket thereof, the anti-theft device comprising:

a pin;

a closing device comprising:

a tubular body sized to fit between the opposite sides of the trailer hitch coupling in alignment with the passageway extending transversely therethrough and to allow passage of a shaft of the pin through the tubular opening by way of the openings in the trailer hitch coupling; and a protrusion extending from the tubular body, the protrusion being arranged to extend from the tubular body, with the shaft of the pin passed through the tubular body and through the openings in the hitch coupling, to obstruct access to the hitch ball receiving socket from below and engage an inner surface of the hitch receiving socket under attempts to pivot the closing device to clear access to the hitch receiving socket;

the pin being arranged for selective locking in position extending through the trailer hitch coupling along the passageway to prevent withdrawal of the pin after passage through the tubular body of the closing device.

BRIEF DESCRIPTION OF THE DRAWINGS

In the accompanying drawings, which illustrate an exemplary embodiment of the present invention.

DETAILED DESCRIPTION

Figure 1:
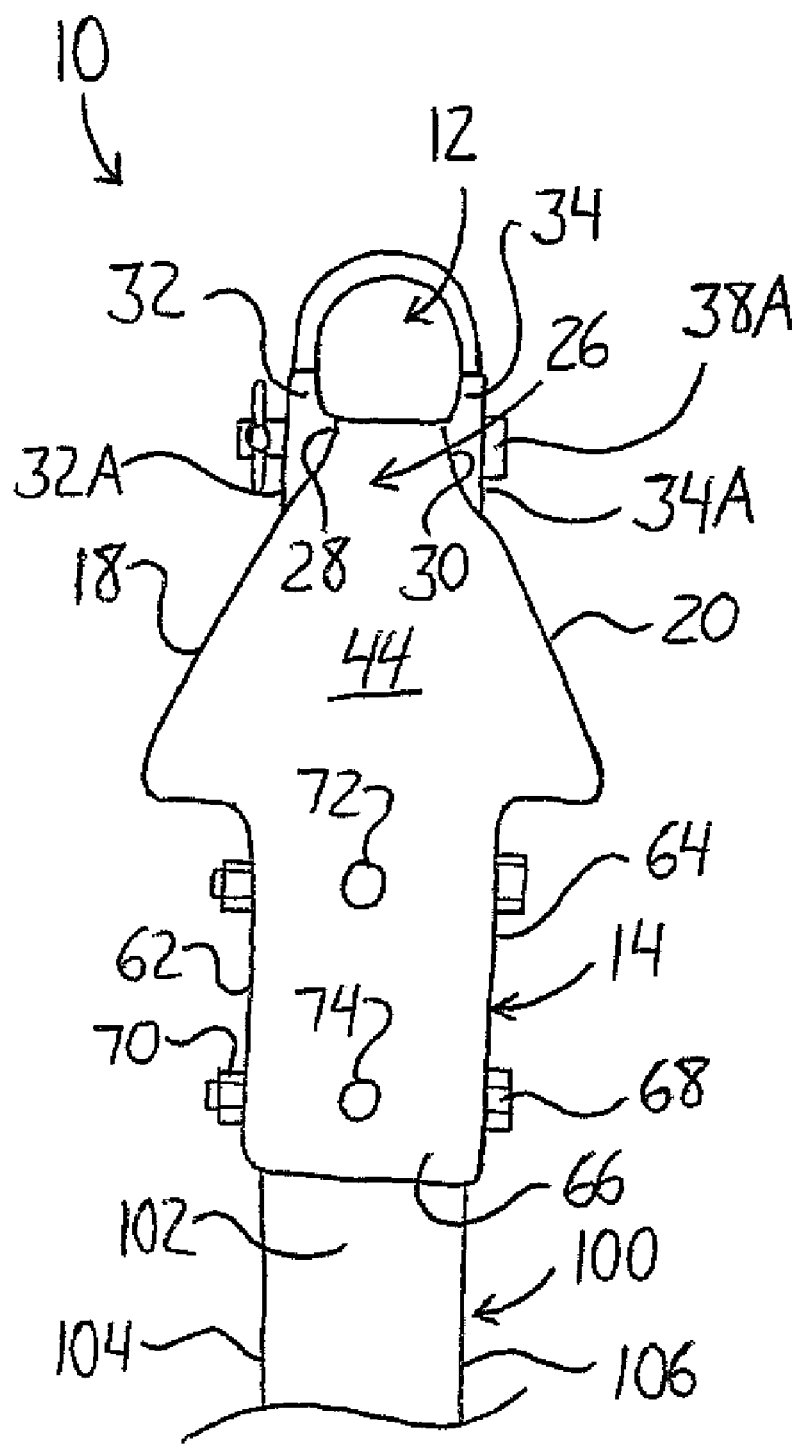
FIG. 1 is an overhead plan view of a hitch coupling in accordance with the present invention mounted on the tongue of a trailer.
Figure 2:
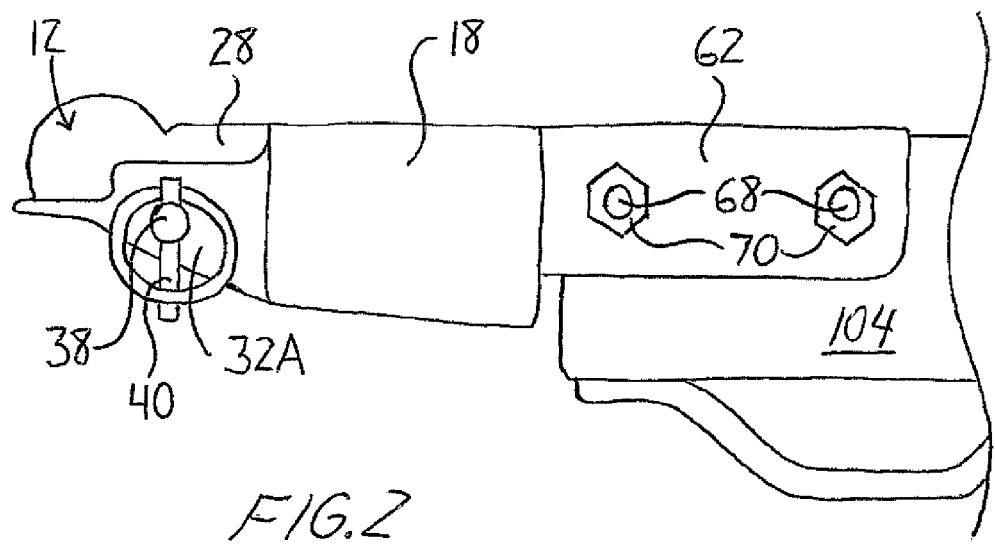
FIG. 2 is a side elevational view of the hitch coupling mounted on the trailer tongue.

FIG. 1 shows a hitch coupling 10 according to one embodiment of the present invention mounted on the tongue 100 of a trailer. The hitch coupling 10 features a ball hitch receiving socket 12 at one end and a mounting bracket 14 at the other. These two components are connected and spaced apart by a guide body 16 such that the receiving socket 12 and guide body 16 are supported past the end 102 of the trailer tongue 100 with the mounting bracket 14 fastened thereto. The guide body 16 has two vertical side walls 18, 20 that are horizontally spaced where they connect to the receiving socket 12 and extend to one side thereof. The side walls 18, 20 diverge horizontally as they extend away from the receiving socket 12 toward the mounting bracket 14 at the opposite end of the coupling. Between the side walls 18, 20 is a plate 22 sloping upward away from the mounting bracket 14 toward the receiving socket 12.

Figure 3:
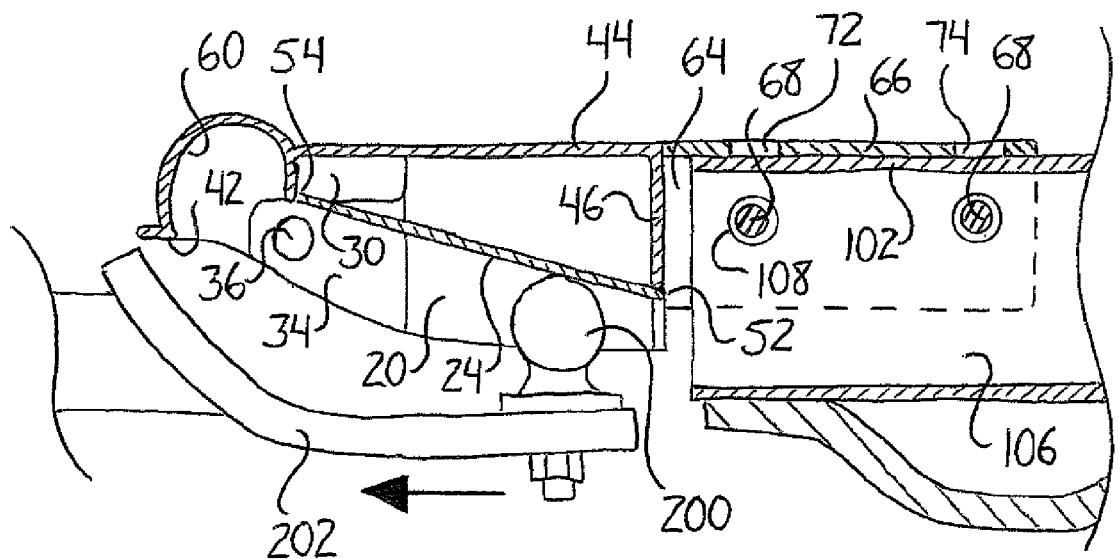
FIG. 3 is a cross sectional view of the hitch coupling mounted on the trailer tongue before coupling with a hitch ball.
Figure 4:
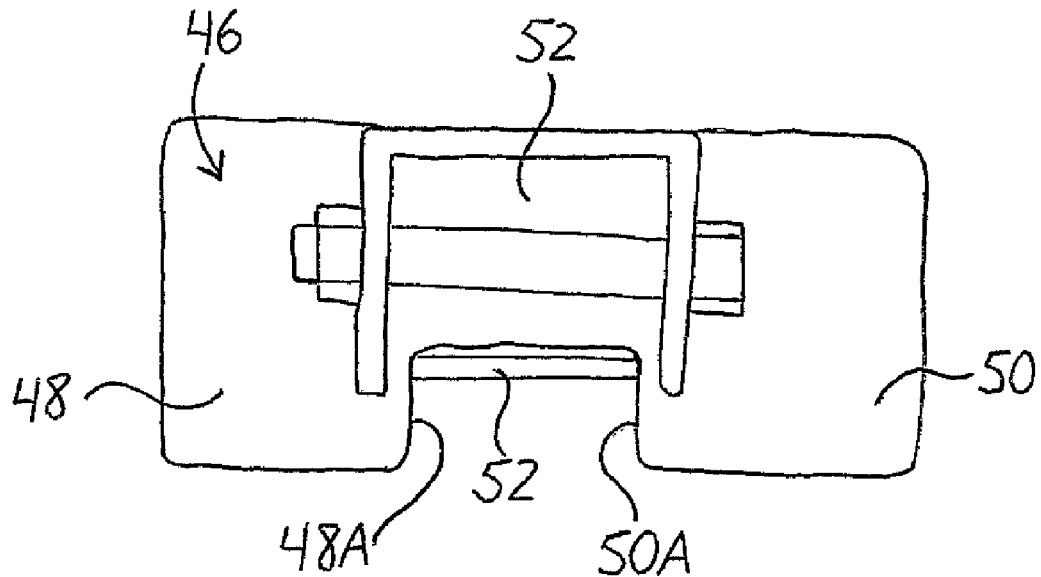
FIG. 4 is a rear elevational view of the hitch coupling.
Figure 5:
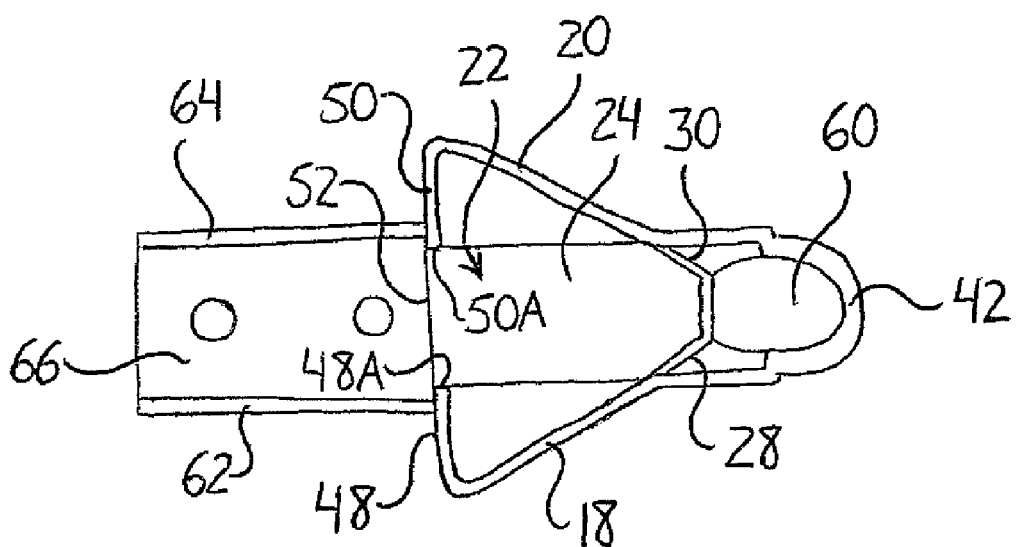
FIG. 5 is a bottom plan view of the hitch coupling.

As shown in FIG. 3, both the receiving socket 12 and the guide body 16 are open at the bottom to receive a hitch ball 200 supported on a towing vehicle, for example by a drawbar 202. In use of the coupling 10, the end 102 of the trailer tongue 100 is externally supported in an elevated position in which the coupler 10 is elevated with respect to the hitch ball 200 and the towing vehicle is backed toward the trailer to position the hitch ball 200 somewhere beneath the guide body 16 and then stopped. The external support is removed to lower the trailer tongue 100 and coupling 10 such that the sloped plate 22 is disposed atop the hitch ball 200. The towing vehicle is then slowly driven forward, causing the hitch ball 200 to do the same as indicated by the arrow in FIG. 3. During this forward motion, the side walls 18, 20 guide the hitch ball 200 toward the receiving socket 12.

The sloped plate 22 assists in connection of the towing vehicle and the trailer by using the trailer's weight to encourage relative movement of the hitch ball 200 toward the receiving socket 12. The bottom of the plate 22 defines a ramping surface 24 along which the hitch ball 200 slides as the towing vehicle and trailer are drawn away from each other to complete the connection process after the coupling 10 is lowered onto the hitch ball 200. A portion of the trailer's weight is exerted on the hitch ball 200 by the plate 22. Due to the inclination of the plate 22 from a horizontal orientation to slope upward toward the receiving socket 12, the trailer tongue 100 and attached coupling 10 tend to move downward and away from the towing vehicle in this situation. In other words, under the weight of the trailer, there is a tendency for relative sliding between the hitch ball 200 and the ramping surface 24 to move the hitch ball 200 and receiving socket 12 into engagement. While this connection-encouraging force may not be enough to cause any actual relative movement, it does contribute to the force needed to cause relative movement of the towing vehicle forward with respect to the trailer to slide the hitch ball 200 into the receiving socket 12.

A mouth 26 of the guide body 16 communicates with an opening to the interior of the receiving socket 12. The mouth 26 features side wall extensions 28, at the top thereof, each of which extends from a respective one of the side walls 18, 20 along an upper edge thereof and is significantly smaller in height than its respective side wall. The side wall extensions 28, 30 continue the narrowing of the guide body 16 toward the receiving socket by converging theretoward to achieve a horizontal spacing at the connection to the socket substantially equal to the interior thereof for housing the hitch ball. Beneath the converging side wall extensions 28, 30 the guide body 16 protrudes laterally outward therefrom to form side chambers 32, 34. The side chambers 32, 34 define parallel vertical outer surfaces 32A, 34A parallel to a longitudinal axis of the coupling 10. Aligned holes 36 are provided in the side chambers 32, 34 through the outer surfaces 32A, 34A thereof to define a passageway extending across the mouth 26 at the opening to the hitch ball interior. A pin 38 is receivable in the passageway with a head 38A of the pin being too large to fit through the holes 36 to prevent passage of the entire pin 38 therethrough. With the pin 38 so received in the mouth 26, a smaller locking pin 40, for example a ring pin, is fed through an opening in the shaft of the pin 38 near the end thereof opposite the head 38A and locked in order to secure the pin 38 in place by blocking withdrawal through the holes 36. This arrangement forms a locking mechanism to secure the hitch ball 200 within the receiving socket 12 after mating thereof, as the pin 38 obstructs the opening to the socket interior to prevent inadvertent withdrawal of the hitch ball. The side chambers 32, 34 extend forward from the side wall extensions 28, 30 passed the opening to the receiving socket interior so that the holes 36 are positioned so that a distance between the pin 38 received therein and a front lip 42 is less than the diameter of the hitch ball 200.

In the illustrated embodiment, the guide body 16 features a top plate 44 spanning between the side walls 18, 20 and the side wall extensions 28, 30 to fully cover the guide body between the receiving socket 12 and mounting bracket 14. A vertical rear wall 46 extends across the guide body at the end thereof connected to the mounting bracket. The rear wall 46 depends downward from the top plate 44 and extends from one side wall to the other. A rectangular portion extending inward from a bottom edge 44A of the rear wall 46 at a longitudinal center thereof is missing, giving the rear wall 46 somewhat of a U-shape, forming two legs 48, 50 depending downward from the top plate 44 on opposite sides of a central portion 52. Such an arrangement allows the guide body to be substantially formed by, for example, casting or stamping with the sloped plate 22 being added afterward, for example, by welding. A straight lower end 52 of the sloped plate 22 is received between the inside edges 48A, 50A of the two leg portions 48, 50 and welded to the rear wall 46. A narrowed upper end 54 of the sloped plate 22 is received between the side wall extensions 28, 30 near the opposite end of the guide body 16. This sloped plate 22 is welded to the side wall extensions in the mouth 26 such that the narrow end extends to a point at or near the opening to the receiving socket interior.

Figure 6:
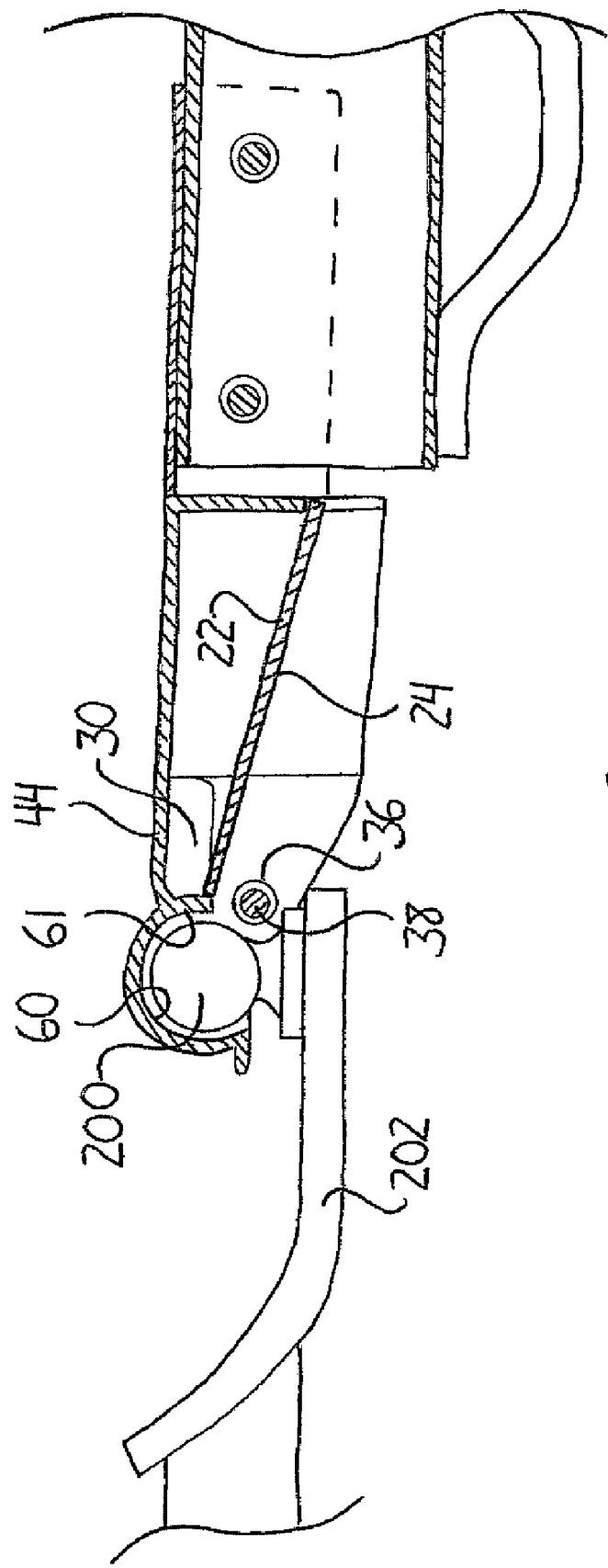
FIG. 6 is a cross sectional view of the hitch coupling and trailer tongue after coupling with the hitch ball.

The ball hitch receiving socket 12 may be formed by casting to have a curved hemispherical or dome-like inner surface 60 so as to provide a relatively snug fit with a conventional hitch ball of substantially spherical shape. Couplings according to the present invention may be made with sockets of various sizes to accommodate various sizes of hitch balls. For example, the hitch receiving socket may be sized to fit any commonly used hitch ball sizes such as 1-7/8", 2" or 2-5/16". FIG. 6 shows the hitch coupling 10 and drawbar-mounted hitch ball 200 of FIG. 3 having been positioned relative to one another by the relative sliding between the hitch ball 200 and the ramping surface 24 for coupling. As shown, a stationary rear wall 61 of the receiving socket 12 nearest the guide body 16 depends downward in a fixed position from the top plate 44 thereof toward, but not past, the upper end 54 of the sloped plate 22. The sloped plate 22 may be secured to the lower end of the rear wall 61 in addition to or instead of to the side wall extensions 28, 30. The upper end 54 of the sloped plate 22 and the lower end of the rear wall 61 are situated above an open bottom of the hitch ball receiving socket 12 defined at the lower extents of the front and sides of the socket. Once the hitch ball 200 is received in the socket 12, this rear wall 61 thereof blocks forward motion of the trailer relative to the towing vehicle. Contact of the hitch ball 200 with the interior surfaces of the receiving socket 12 thus helps prevents the separation of the hitch ball 200 and socket by restricting relative motion therebetween. With the trailer and vehicle so positioned and coupled the trailer, if previously having its wheels blocked or otherwise secured during the coupling action, can be released without fear of the trailer rolling away from the towing vehicle. With the hitch ball 200 thus received in the socket 12, the pin 38 is then passed through the holes 36 in the side chambers 32, 34 and secured with locking pin 40 to prevent vertical separation of the hitch ball 200 and coupling 10 and thus complete a secure connection between the towing vehicle and trailer.

In the illustrated embodiment, the mounting bracket 14 features two vertical side plates 62, 64 horizontally spaced apart depending downward from a horizontal top plate 66. This arrangement defines a rectangular channel between the side plates 62, 64 into which the rectangular tongue 100 of the trailer can be received. The mounting bracket thus fits over the tubular trailer tongue 100 with the top plate 66 resting on the top wall 102 of the tongue and the side plates 62, 64 depending downward along the side walls 104, 106. Pairs of aligned holes are provided in the side plates 62, 64 of the mounting bracket 14 to facilitate the passing of bolts 68 through corresponding holes 108 created in the side walls 104, 106 of the trailer tongue 100 to mate with nuts 70 to secure the coupling 10 on the trailer. Having two or more pairs of aligned holes prevents pivoting of the coupling about a bolt. Two holes 72, 74 are also provided in the top plate 66 of the mounting bracket to facilitate mounting of the bracket on the trailer tongue by vertically extending fasteners. The plates of the mounting bracket 14 connect to the guide body 16 at the rear wall 46 thereof.

As shown in the Figures, the bottom edges at the sides of the guide body may slope upward toward the ball hitch receiving socket. With the sides of the guide body extending below the ramping surface 24 at all points therealong, once the ramping surface is resting atop the ball hitch, the sides prevent the ball hitch from sliding out from under the ramp. In the illustrated embodiment, the plate 22 defining the ramping surface 24 does not span the full width of the guide body 16 along the full length thereof, but rather spans enough of the width such that the open space between the plate 22 and each of the side walls 18, 20 is not large enough to receive hitch ball 200. As a result, the hitch ball 200 will not get caught up between the plate and the side walls, thereby ensuring that positioning of the hitch ball between the side walls anywhere between the side walls and forward of the rear wall allow hitching to be carried out successfully.

It should be appreciated that the sloped ramping surface may be provided in ways other than welding or otherwise securing a sloped plate beneath a top plate of the guide body. For example, the guide body side walls of one embodiment could feature sloped upper edges supporting a sloped top plate, the bottom of which defines the ramping surface. In another embodiment, the top plate and sloped plates could be replaced with a single wedge-like member defining both a horizontal upper surface and a sloped bottom surface. Alternatively, the sloped plate 22 may be formed integrally with the rest of the guide body using casting techniques known to those of skill in the art. Using this method of production, the hitch coupling may be produced in entirety by a single casting process. The mounting bracket may be formed integrally with the guide body, or alternatively added thereto, for example by welding, after separate formation.

Alternate methods of fastening the guide body and receiving socket to a trailer will be appreciated by those of skill in the art and may be readily applied to the coupling of the present invention. For example, the mounting bracket could be welded, rather than bolted, to the tongue of a trailer or the tongue mounting bracket could be replaced with an A-frame mounting bracket known to those of skill in the art.

Figure 7:
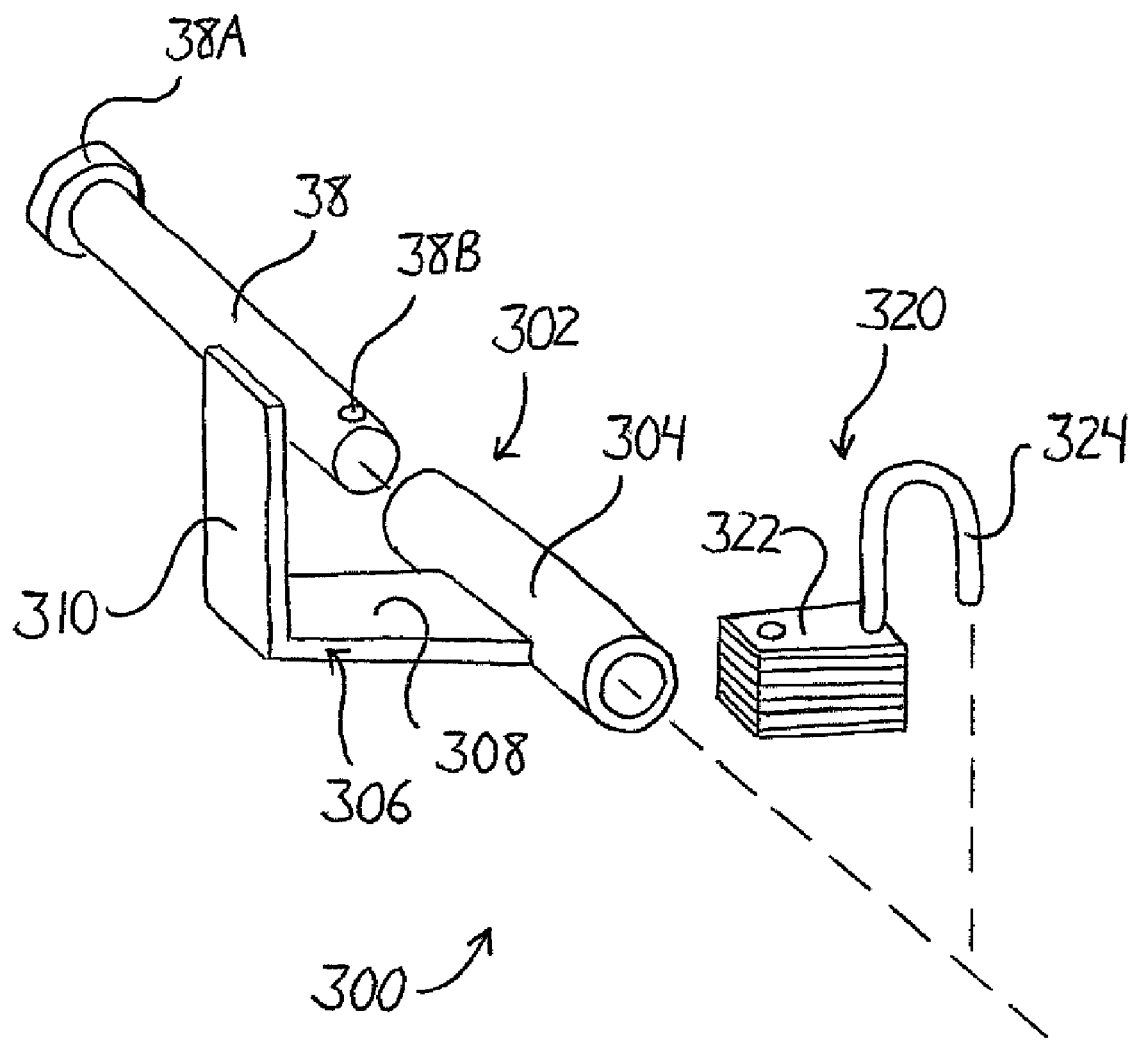
FIG. 7 is an exploded perspective view of an anti-theft arrangement for use with the hitch coupling.
Figure 8:
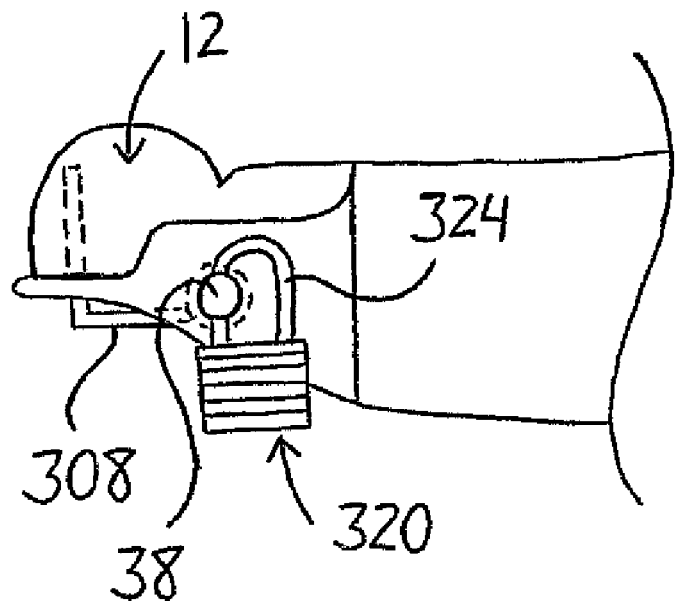
FIG. 8 is a side elevational view of the hitch coupling with the anti-theft arrangement in use.
Figure 9:
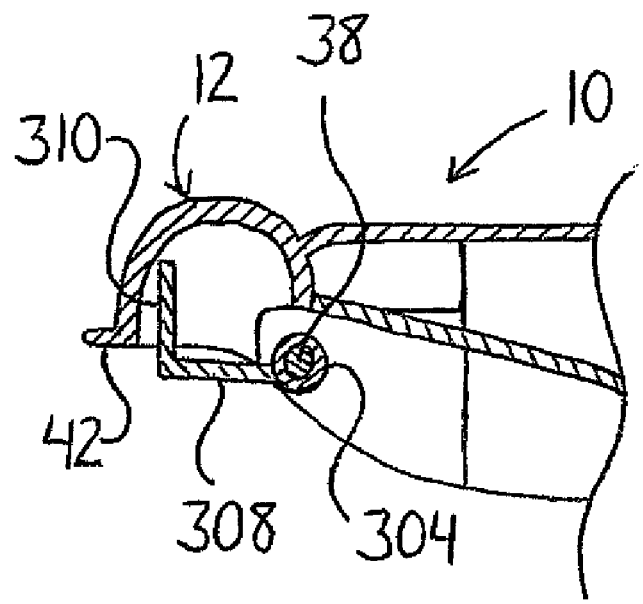
FIG. 9 is a cross sectional view of the hitch coupling and anti-theft arrangement of FIG. 8.

FIGS. 7 to 9 show an anti-theft arrangement 300 for use with the hitch coupling 10 to prevent theft of the trailer by a person having a towing vehicle with a suitable hitch ball for cooperating with the coupling. The assembly features a socket-closing device 302 and a padlock 320 that cooperate with the pin 38 that, as explained above, is used to secure a hitch ball in the receiving socket 12 of the coupling 10. The socket closing device 302 features a hollow cylindrical body 304 of suitable size to fit lengthwise between the aligned holes 36 in the sides of the coupling 10, which define the passageway through which the shaft of the pin 38 is passable to secure a hitch ball in the receiving socket 12 as described above, and to allow passage of the shaft of the pin 38 through its hollow interior. A right angle protrusion 306 has a first portion 308 extending outward from the wall of the cylindrical body 304 and a second portion 310 extending to one side of the first portion at a ninety degree angle thereto. The padlock 320 is of a conventional structure featuring a body 322 and a shackle 324.

For use, the anti-theft arrangement 300 is installed on the hitch coupling 10 when not engaged to a hitch ball of a towing vehicle. A user positions the socket closing device 302 in the throat 26 of the coupling 10 between the aligned holes 36 in the side chambers 32, 34 to align the holes 36 with the hollow interior of the cylindrical body 304. The closing device 302 is oriented by the user such that the first portion 308 of the right angle protrusion 306 forward from the throat 26 of the coupling toward the front lip 42 of the receiving socket 12. Rearward of the lip 42, the second portion 310 of the right angle protrusion 306 extends upward within the receiving socket 12. The shaft of the pin 38 is then passed through the aligned holes 36 in the coupling and cylindrical body 304 of the socket closing device to position a through-hole 38B extending through the shaft of the pin near and end 38C thereof opposite head 38A on a side of the coupling opposite the pin's head. One side of the shackle 324 of the padlock 320 is then passed through the hole 38B in the pin shaft and the padlock is then locked in a typical manner.

Once installed, the socket closing device 302 blocks access to the receiving socket 12 so that a potential thief cannot fit the hitch ball of a towing vehicle into the socket and tow the trailer away. More specifically, the pin 38 and cylindrical body 304 block access to the receiving socket 12 along the sloped plate 22 and the first portion 308 of the right angle protrusion 306 blocks access from directly below the socket. Pivoting of the socket closing device 302 about the pin 38 on which it is supported is limited in either direction by contact between the interior surface of the receiving socket and the second portion 310 of the right angle protrusion 308. As a result, access to the socket from below cannot be gained by pivoting of the cylindrical body about the pin, only by lowering the closing device from its installed position, which requires removal of the padlock and pin. The anti-theft arrangement makes use of the same holes and possibly even the same pin as the locking mechanism used to secure the hitch ball within the socket during trailer use, is easily removable to prevent interference with use of the ramping surface to effect coupling of the trailer and tow vehicle and provides significantly more substantial closure of the socket than use of a pin alone by additionally blocking access from directly below the socket.

The socket closing device 302 may be produced, for example, by welding a length of angle iron to a length of tubing. From the figures and description above, it should be appreciated that cooperation of the pin and padlock may be used in place of the pin and padlock combination used to provide secure coupling between the trailer and towing vehicle. Using a device lockable, for example, by key or combination in such a context would help prevent theft of the trailer when connected to a towing vehicle by the hitch coupling by preventing separation by a person not possessing the necessary key, combination or tool to open the lock. It should also be appreciated that the anti-theft arrangement may be used with other types of hitch couplings having aligned holes are provided in opposite sides of a hollow channel proximate the opening to the hitch receiving socket.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A hitch coupling for mounting on a trailer for engagement with a hitch ball mounted on a towing vehicle, the hitch coupling comprising:
   a hitch ball receiving socket;
   a guide body connected to the hitch ball receiving socket and extending to one side thereof; and
   a mounting body extending from the guide body at an end thereof opposite the hitch ball receiving socket;
   the guide body comprising:
      two generally vertical side walls being horizontally spaced apart adjacent the one side of the hitch ball receiving socket and diverging horizontally away therefrom; and
      a sliding surface extending between the two generally vertical side walls for sliding contact of the hitch ball with the sliding surface toward the hitch ball receiving socket;
   and the hitch ball receiving socket comprising a stationary wall disposed in a fixed position relative to the guide body and extending downward toward the sliding surface at an end of the hitch ball receiving socket proximate the guide body.

2. The hitch coupling according to claim 1 wherein the sliding surface is defined by a plate supported between the two generally vertical side walls.

3. The hitch coupling according to claim 1 wherein each generally vertical side wall extends below the sliding surface.

4. The hitch coupling according to claim 1 wherein the sliding surface extends upward away from the mounting body toward the hitch ball receiving socket.

5. The hitch coupling according to claim 1 wherein the sliding surface reaches the hitch receiving socket.

6. The hitch coupling according to claim 1 wherein the sliding surface extends from the mounting body to the hitch receiving socket.

7. The hitch coupling according to claim 1 wherein an end of the sliding surface nearest the hitch ball receiving socket is disposed at an elevation above an open bottom thereof.

8. The hitch coupling according to claim 1 wherein the stationary wall of the hitch ball receiving socket is rigidly mounted to the guide body.

9. A hitch coupling for mounting on a trailer for engagement with a hitch ball mounted on a towing vehicle, the hitch coupling comprising:
   a hitch ball receiving socket;
   a guide body connected to the hitch ball receiving socket and extending to one side thereof; and
   a mounting body extending from the guide body at an end thereof opposite the hitch ball receiving socket;
   the guide body comprising:
      two generally vertical side walls being horizontally spaced apart adjacent the one side of the hitch ball receiving socket and diverging horizontally away therefrom; and
      a sliding surface defined between the two generally vertical side walls and extending upward away from the mounting body toward the hitch ball receiving socket, an upper end of the sliding surface being disposed at an elevation above an open bottom of the hitch ball receiving socket.

10. The hitch coupling according to claim 9 wherein the sliding surface is defined by a plate supported between the two generally vertical side walls.

11. The hitch coupling according to claim 9 wherein each generally vertical side wall extends below the sliding surface.

12. The hitch coupling according to claim 9 wherein the guide body further comprises a top plate spanning between the two generally vertical side walls at top edges thereof.

13. The hitch coupling according to claim 9 wherein the sliding surface reaches the hitch receiving socket.

14. The hitch coupling according to claim 9 wherein the sliding surface extends from the mounting body to the hitch receiving socket.

* * * * *